(12) United States Patent
Ulenas

(10) Patent No.: US 7,979,314 B2
(45) Date of Patent: Jul. 12, 2011

(54) METHOD AND APPARATUS FOR OBTAINING CONSUMER PRODUCT PREFERENCES THROUGH INTERACTIVE PRODUCT SELECTION AND EVALUATION

(76) Inventor: Jonas Ulenas, Port Washington, NY (US)

( * ) Notice: Subject to any disclaimer, the term of this patent is extended or adjusted under 35 U.S.C. 154(b) by 1278 days.

(21) Appl. No.: 11/481,770

(22) Filed: Jul. 5, 2006

(65) Prior Publication Data

US 2007/0016488 A1    Jan. 18, 2007

Related U.S. Application Data

(63) Continuation of application No. 09/938,125, filed on Aug. 23, 2001, now Pat. No. 7,072,847.

(60) Provisional application No. 60/227,962, filed on Aug. 25, 2000.

(51) Int. Cl.
*G06Q 30/00* (2006.01)

(52) U.S. Cl. ............................. 705/26.1; 705/10; 705/27

(58) Field of Classification Search .................... 705/26, 705/10, 26.1–27.2
See application file for complete search history.

(56) References Cited

U.S. PATENT DOCUMENTS

| | | | |
|---|---|---|---|
| 5,600,831 A * | 2/1997 | Levy et al. ....................... | 706/45 |
| 5,675,784 A | 10/1997 | Maxwell et al. | |
| 5,819,285 A | 10/1998 | Damico et al. | |
| 5,913,210 A | 6/1999 | Call | |
| 5,918,214 A | 6/1999 | Perkowski | |
| 5,933,811 A * | 8/1999 | Angles et al. ............. | 705/14.56 |
| 5,983,214 A | 11/1999 | Lang et al. | |
| 5,999,914 A * | 12/1999 | Blinn et al. .................. | 705/26.8 |
| 5,999,924 A | 12/1999 | Bair et al. | |
| 6,006,225 A | 12/1999 | Bowman et al. | |
| 6,009,407 A | 12/1999 | Garg | |
| 6,029,161 A | 2/2000 | Lang et al. | |
| 6,119,101 A * | 9/2000 | Peckover ........................ | 705/26 |
| 6,216,129 B1 * | 4/2001 | Eldering ..................... | 705/36 R |
| 6,307,568 B1 * | 10/2001 | Rom ................................ | 345/629 |
| 6,895,387 B1 * | 5/2005 | Roberts et al. ............. | 705/14.47 |
| 2001/0042002 A1 * | 11/2001 | Koopersmith ................. | 705/10 |

FOREIGN PATENT DOCUMENTS

| | | |
|---|---|---|
| JP | 11265243 A | 9/1999 |
| WO | WO-97/38376 | 10/1997 |

OTHER PUBLICATIONS

Business Wire, p. 5201056, May 20, 1996, Softscape introduces Softscape Explorer Plus, powerful new "Desktop Information Manger."*

Business Wire, p. 5201056, May 20, 1996, Softscape, introduces Softscape Explorer Plus, powerful new "Disktop Information Manager."

Google Groups, Comp.databases.ms-sqlserver, (Feb. 2, 1999).

* cited by examiner

*Primary Examiner* — Jason Dunham

(74) *Attorney, Agent, or Firm* — IM IP Law PLLC; C. Andrew Im

(57) ABSTRACT

A method and system for obtaining consumer preferences over a communication network from consumers. The system searches the product database for products or services based on consumer's search criteria. The system displays the products or services and/or advertisements related to the consumer's search criteria in accordance with the ranking parameter(s) specified by the user. The consumer's preferences, i.e., the search criteria and the ranking parameter(s), are stored in the database for future references, e.g., determine consumer trends, etc.

23 Claims, 5 Drawing Sheets

METHOD AND APPARATUS FOR OBTAINING CONSUMER PRODUCT PREFERENCES THROUGH INTERACTIVE PRODUCT SELECTION AND EVALUATION

RELATED APPLICATION

This application is a continuation of U.S. application Ser. No. 09/938,125 filed Aug. 23, 2001, issued as U.S. Pat. No. 7,072,847, which claims benefit of U.S. Provisional Patent Application No. 60/227,962, filed on Aug. 25, 2000 which are hereby incorporated by reference in their entireties.

BACKGROUND OF THE INVENTION

Manufacturers and other suppliers need to have a sufficient understanding of consumers' desires and requirements to ensure that the products manufactured or sold are successful in the market place. However, it has become increasingly impractical and increasingly difficult to have first hand knowledge about consumer preferences, as the size of manufacturing/supply organizations and consumer populations have grown. Yet, every marketer yearns to know the motivation behind consumers' decisions to purchase certain goods and services. To fill this need, the science, art, and business of marketing research has replaced first hand experience as the link between manufacturer, retailer, businessmen and their customers. The marketing industry has developed various marketing research techniques to obtain this knowledge as accurately as possible. These techniques range from the analysis of actual sales and shipment data to various methods of surveying consumers. The latter techniques include door-to-door interviews, telephone interviews, questionnaires, focus groups, and similar forms of surveys.

However, these techniques have significant problems relating to the underlying statistical principles, human nature, etc. For instance, it is well known that people's answers to why they buy in surveys are often inaccurate and useless. Direct questioning rarely unveils the genuine motives of buyers. Focus groups face the problems of the dominant individual, and the general tendency of many people to simply please others. Ranking surveys encounter the problem of reluctance to select either extreme of the measurement scale. Random selection produces the statistical problem of establishing the population frame of interest. While surveys of the general population, represented by the typical random sample, provide useful data, the views and preferences of the segment of the population that is seriously considering the purchase of a particular product prove to be that much more useful. The prior art provides no reliable cost effective methods to establish such a desired population. Subdividing the surveyed sample by answer to the question "are you at this time seriously considering a purchase" raises the statistical problem of skewing the population frame and thereby compromising the statistical soundness of the results. Accordingly, marketing researchers would find it invaluable to have the ability to map the considerations of consumers as they are forming their product or service purchase decisions.

Just as manufacturers and suppliers face the task of understanding consumer preferences, consumers face the task of obtaining sufficient information about many products when trying to make an informed buying decision. The task becomes most difficult when the product of interest falls into a class of products having considerable financial consequences, such as automobiles, that are expensive, complex with respect to product features, and numerous with respect to various options. Each consumer attaches different importance levels to different parameters or criteria of a product. For example, the parameters/criteria of automobiles include price range, legroom, trunk capacity, etc., with each having a different level of importance to each consumer. In considering laptop computers, some consumers find weight to be the most important factor while others focus on performance, screen size, etc. In choosing vacation resorts or hotels, some consumers find beachfront location to be the most important factor while others find it crucial to have on-the-premises entertainment, family-friendly environment, secluded location, etc. Even after investing a considerable amount of time obtaining information from various sources, the consumer is still left wondering whether he/she has missed other possible products or services. Consumers find it difficult to compare services or products because the information is typically spread amongst a number of sources. A product leaflet or a web site on a particular model laptop personal computer may list screen size but not weight. Automobile product information may list horsepower but not acceleration time or braking distance.

Advertisers consider targeted, rather than broadcast, advertisements to be highly desirable. Advertisers of computers and computer-related equipment place their ads in computer magazines; hotel and resort ads appear in travel magazines and travel sections of newspapers. Advertisers on television generally target their advertisements to programs appropriate for the desired customer base. Advertisers using the World Wide Web face a problem in targeting their advertising, since the interest profile of a user accessing a web site is not known, as it may be in the case of a magazine.

Several patents have attempted to address this problem, such as U.S. Pat. No. 5,948,061 and U.S. Pat. No. 6,026,368. These methods depend on setting a "cookie" on the user's disk, that is writing information to the user's disk recording the user's actions in accessing the web, a practice that has privacy implications. In addition to privacy concerns, users can disable "cookies", or delete them from their drives, thereby compromising these approaches to targeted advertising.

OBJECTS AND SUMMARY OF THE INVENTION

The present invention overcomes these problems in marketing research, consumer product selection, and targeted advertising, while preserving user privacy. It provides consumers with a tool to research potential purchases in a novel way, allowing consumers to focus on products or services meeting their needs and preferences as closely as possible. In accordance with an embodiment of the present invention, the system provides all products/models in a product class of interest that fall within a range of criteria and/or possess certain attributes specified by the consumer. In accordance with an aspect of the present invention, the consumer can rank the selected products by desired criteria/attributes. Preferably, the consumer can further refine the search and analysis, including performing a virtual reality examination of products and virtual evaluation for fit. That is, the present invention facilitates the consumer's product research task by enabling the consumer to select from a large population of products or services a subset of such products or services, falling within the consumer's range of interest and ranked by characteristics deemed important to the consumer.

These expressions of consumer preferences and ranking selections are an excellent indication of which product or service offers the consumer's preferred criteria/attributes. In addition, the present invention advantageously obtains this data without violating the consumer's privacy because it does not need to need to identify the consumer to accomplish its objectives. The present invention compares favorably to a showroom visit, where a consumer asks the salesman product related questions. From these questions, the salesman can draw certain conclusions about the consumer's interest and can form opinions about the preferences and interests of the consumer population segment visiting the showroom. The present invention collects the consumers' selections and rankings in a database for further analysis and reporting, providing high quality marketing research data without the need for individual consumer identification.

Hence, the present invention avoids the major weaknesses of present marketing research methods by being non-intrusive, and yet selective in attracting consumers considering purchases. It does not require the consumer to participate in surveys, focus groups or any other artificial grouping. Rather, the present invention enables the consumer to remain in his/her familiar home or business surroundings. The consumer can autonomously choose to investigate products and express his/her preferences. Accordingly, the present invention captures product or service preferences from the population of primary interest in marketing research, those individuals that are investigating products or services and forming a purchase decision.

The expression of consumer preferences and rankings obtained with the present invention provides advertisers with the ability to present consumers with highly targeted advertising. The present invention can provide the consumer with advertising information regarding the selected product brand, brands that rank in the top positions as determined by consumer preferences, and/or other products that enhance, accessorize, or support the preferred criteria. For instance, in the case of automobiles, if a consumer ranked trunk space as a top priority, the present invention can display accessories that are helpful in arranging or holding down items in the trunk. If a consumer ranked beachfront location highly in a search for hotels, the present invention can display suntan lotion advertisements. The current targeted advertising methods depends on "cookies", where information is written to the consumer's disk drive, to deliver targeted advertising. However, the present invention does not utilize "cookies" to deliver targeted advertising because the consumer has explicitly expressed product or service preferences and ranked them. Based on this information alone, the present invention precisely selects and targets advertising without any invasion of the consumer's privacy.

In accordance with an embodiment of the present invention, the system operates over the communications networking such as the Internet. In accordance with an aspect of the present invention, the system operates over a closed or private network where agents or other users, in response to consumer or prospect inquiries, selects products or services, which have numerous parameter and criteria requirements and/or specifications.

An object of the present invention is to provide a system and technique for obtaining and collecting user product or service offering preference (marketing research) data over a network.

Another object of the present invention is to provide a system and technique for providing a consumer with the option to select products and/or services by specifying and ranking parameters and requesting certain discrete attributes over a network.

A further object of the present invention is to provide a system and technique for delivering targeted advertising information over a network.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENTS

The term "computer" represents an information processor or device, such as personal digital assistant, web-enabled phone, wireless device and other comparable portable devices. Among other things, the computer can interface with a communications network, such as the Internet, to accept a user's input by any means possible. Such means include, but are not limited to, (1) touch, such as a keyboard, touch sensitive surface, pointing device, and the like; (2) sound, such as voice, handclap, or any other sound; (3) light, in both the visible or not visible spectrum; and (4) any other input means. A "computer" can also notify a user of received information and display such information by any means, including but not limited to visual, audio, and mechanical motion means.

The present invention is readily implemented by presently available communications apparatus and electronic components. The invention find ready application in virtually all commercial communications networks, including, but not limited to an intranet, a local area network (LAN), a wide area network (WAN), world wide web, a telephone network, a wireless network, and a wired cable transmission system.

The present invention avoids the weaknesses of present marketing research methods by offering complete product or service offering information through an interactive process that guides consumers to focus on the criteria most important to them. The system allows consumers to focus in on those products or service offerings most likely to satisfy their needs. The consumers select the criteria ranges, attributes, and other parameters of interest in the order most important to them. Neither a fixed questionnaire nor a skilled interviewer, of which there are few, can compare to the natural way in which the present invention allows consumers to their make product or service offering choices. This guided, interactive process generates market research data of unprecedented quality.

Figure 1:
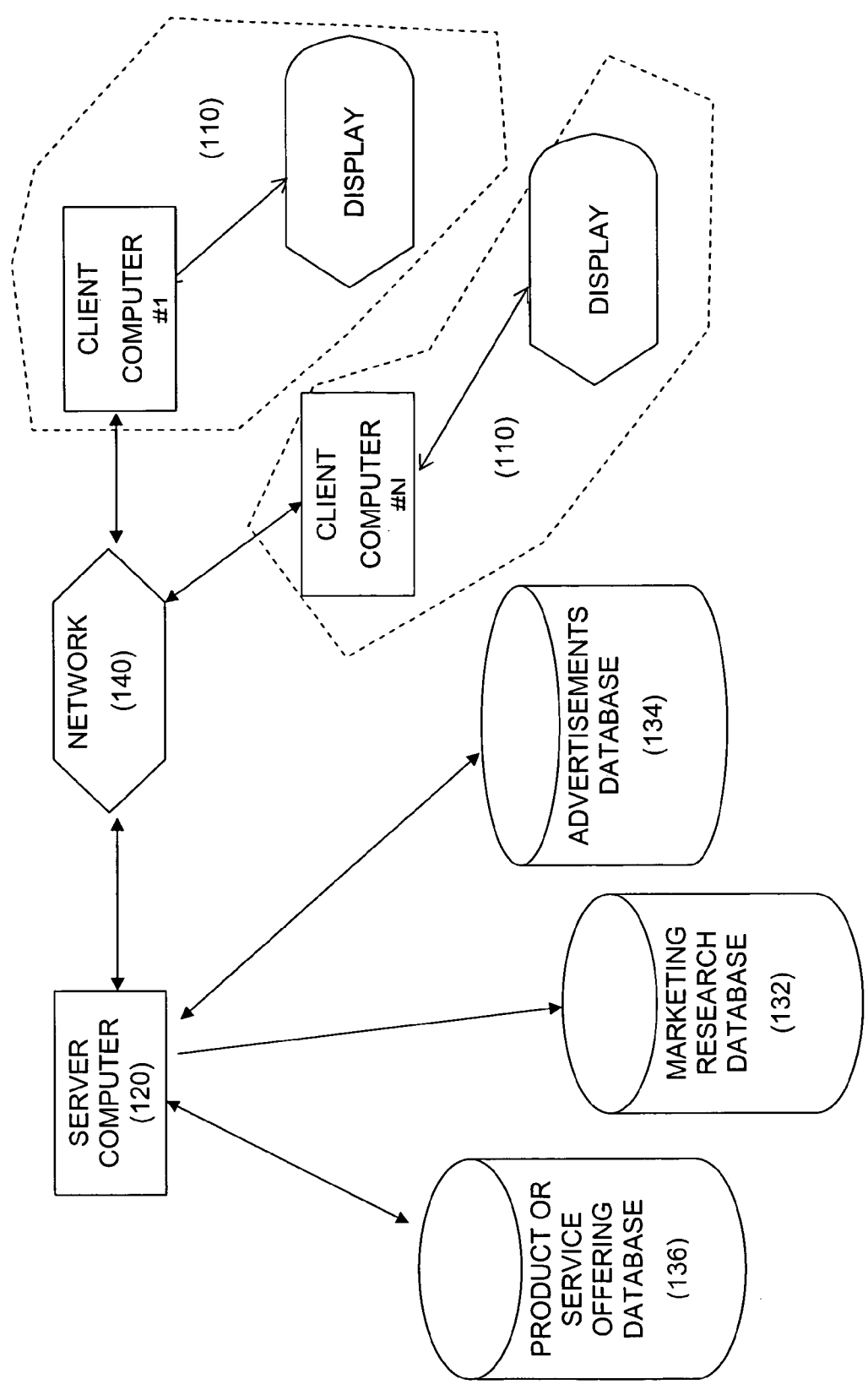
FIG. 1 is a block diagram of the system architecture of the present invention.

Turning now to FIG. 1, there is an illustrated system 100 in accordance with the present invention. The system 100 comprises a plurality of personal computers or processing devices 110 connected to an on-line application server or servers 120 over a communications network 140. The server 120 accesses the databases 130 shown in FIG. 1. Users access the system 100 via client computers or processing devices 110.

Figure 3A:
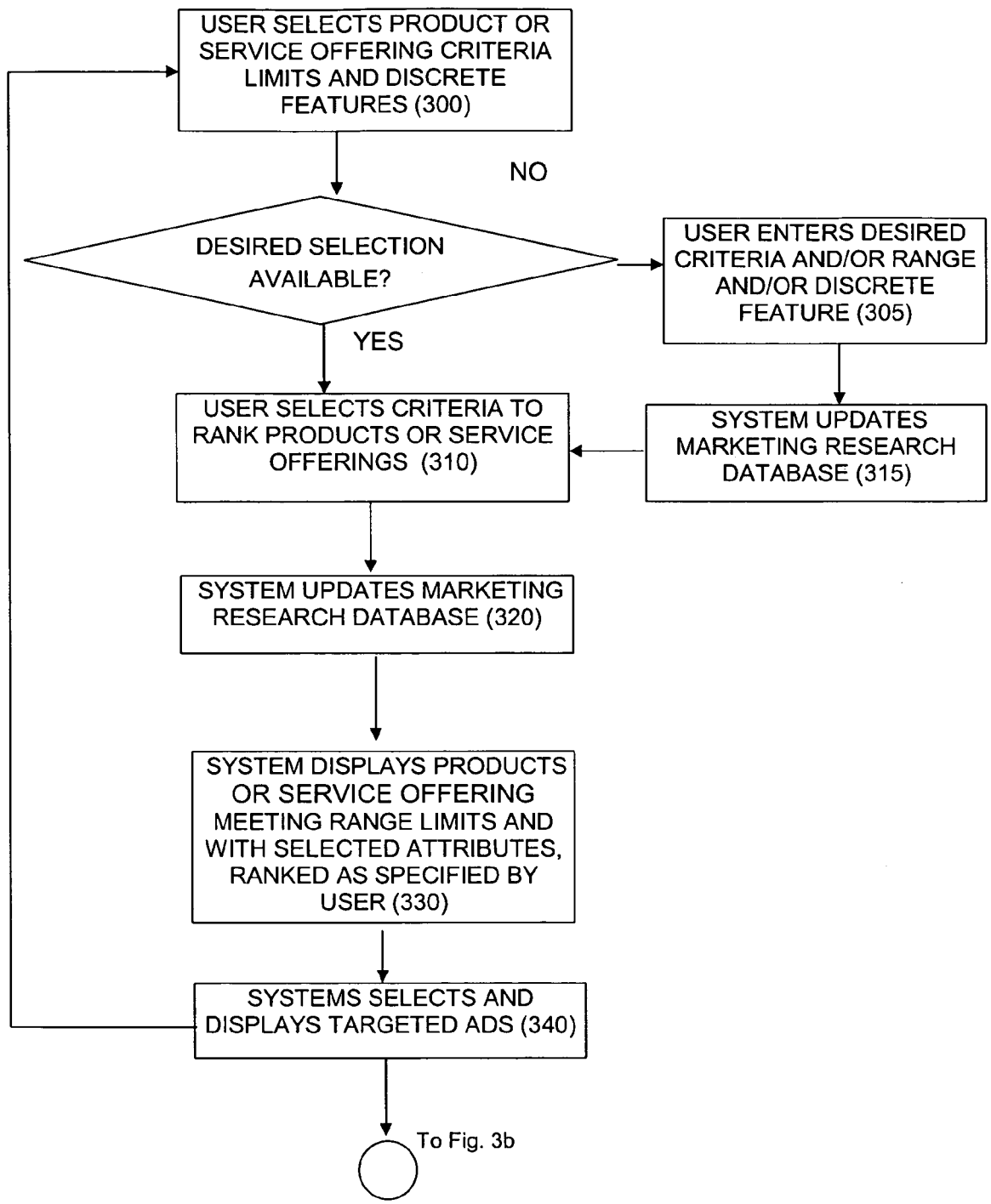
FIGS. 3A and 3B are flow charts describing the operation of the present invention.
Figure 3B:
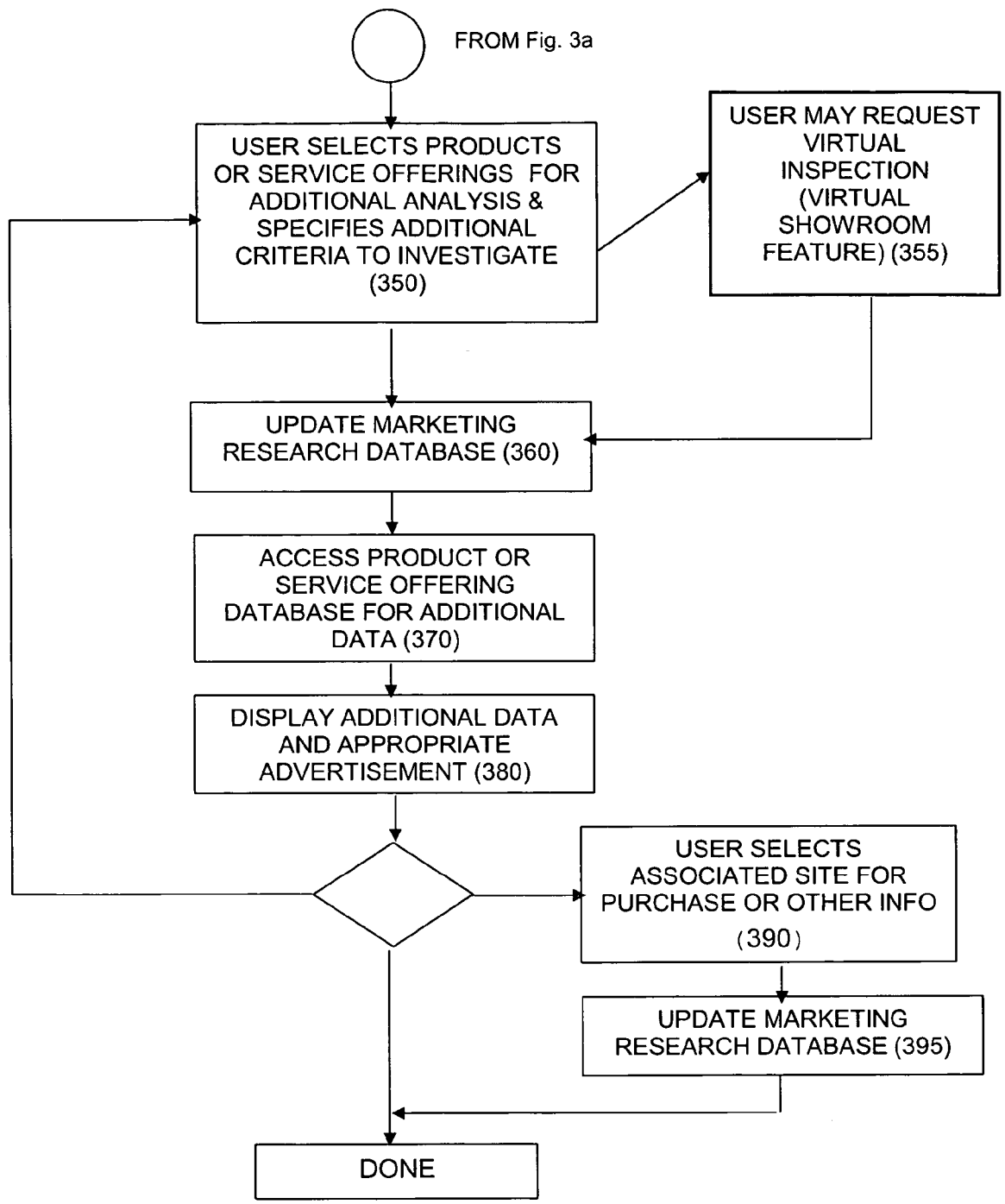

The operation of an embodiment of the system 100 in accordance with the present invention is described in conjunction with a flow chart delineated in FIGS. 3a and 3b. In FIG. 3a, the process begins when a user accesses the system 100 to investigate products or service offerings. The server 120 interactively guides the user to determine the user's needs and preferences in step 300. That is, the server 120 prompts the user to specify ranges for one or more parameters, selects discrete attributes in step 300. If the user's desired selection criteria or parameters are not available or offered by the system 100, the user can enter one or more new selection criteria or parameter, discrete attributes and the range for each new parameters in step 305. The server 120 records or stores the user's new selections and specifications in the marking research database 132 in step 315. In accordance with an embodiment of the present invention, the interactive process of steps 305 and 310 continues until the user has entered all of the desired new selection criteria or parameters, discrete attributes and ranges. The user also specifies features to be used in ranking products or service offerings through a client computer 110 in step 310.

The server 120 records or stores the user's selections and specifications in the marketing research database 132 in step 320 and displays all product models or service offerings in the product or service offering database 136 meeting the user's expressed needs and preferences in step 330, preferably, ranked according to the user's specifications. The server 120 also searches the advertisement database 134 for advertisements relating the top ranked displayed products or services in step 340. If the advertisement database 134 includes any advertisements related to the top ranked products or service offerings, the server 120 displays such advertising information with the products or service offerings in step 340.

It is appreciated that user can express different preferences (i.e., add or change ranges, criteria, etc.) at any time. In such case, the server 120 reviews the previously displayed advertisements and either replaces them with new advertisements or removes them when they are no longer appropriate. In accordance with an embodiment of the present invention, the server 120 can repeat steps 300-340 to solicit modifications to the selected criteria ranges, discrete attributes, and rankings, and such modifications are recorded or stored in the marketing research database 132. That is, the interactive process of steps 300-340 continues until the user indicates that all needs and preferences have been expressed. Alternatively, the user can use the server 120 to generate new selection criteria or parameter to further enhance his/her product (or service offering) search. The server 120 records any further expressions of preference and interest in the marketing research database 132. In accordance with an embodiment of the present invention, the server 120 marks the user preferences with date and time information, which the server 120 uses to identify trends over time. Preferably, the server 120 can generate reports identifying such marketing trends. It is appreciated that the server 120, however, acquires such information without having to identify the user personally or write "cookies" to the disk of the user's personal computer 110.

Turning now to FIG. 3b, in accordance with an embodiment of the present invention, the server 120 can present the displayed product models or service offerings selected by the user for closer or detailed analysis and/or additional information in step 350. In accordance with an aspect of the present invention, the server 120, through the client computer 110, provides the user with a virtual tour or inspection of products or service offerings over the network 140 in step 355. The virtual inspection or examination allows the user to change viewpoint, both in angle and in distance. Preferably, the server 120 also tests the fit of a product by soliciting an image of the user through an appropriate input device and comparing such image with a stored proportional image of the product of interest in step 355. It is appreciated that such analysis includes, but is not limited to, virtual reality examinations, virtual fit tests, and other virtual reality exploration functions.

The server 120 records or stores the user's selections for detailed analysis in the marketing research database 132 in step 360. In accordance with an embodiment of the present invention, the server 120 marks the user selections with date and time information, which the server 120 uses to identify trends over time. Preferably, the server 120 can generate reports identifying such marketing trends. It is appreciated that the server 120, however, acquires such information without having to identify the user personally or write "cookies" to the disk of the user's personal computer 110.

The server 120 accesses the product or service offering database 136 for additional data relating to the selected product models or service offerings in step 370 and displays such additional data in step 380. The server 120 also searches the advertisement database 134 and displays advertisements relating to the selected product models or service offerings in step 380. It is appreciated that user can select different product models or service offerings for detailed analysis and/or additional information by repeating steps 350-380.

In accordance with an embodiment of the present invention, the user can select to access or visit a web site associated with the selected product models or service offerings in step 390. For example, the user can access or visit the associated web site to purchase or obtain additional information about the selected product models or service offerings. The server 120 records or stores any access or visits to the associated web site, an advertiser's web site, an unrelated web site, etc., by the user in the marketing research database 132 in step 395. That is, the server 120 records whether, in exiting the system 100, the user proceeds to a web site selling the particular products or service offerings, an advertiser's web site, another associated web site, an unrelated web site, or exits the world wide web (i.e., the Internet). The server 120 marks the user's visit or access of a particular web site with date and time information, which the server 120 uses to identify trends over time. Preferably, the server 120 can generate reports identifying such marketing trends. It is appreciated that the server 120, however, acquires such information without having to identify the user personally or write "cookies" to the disk of the user's personal computer 110.

Figure 2:
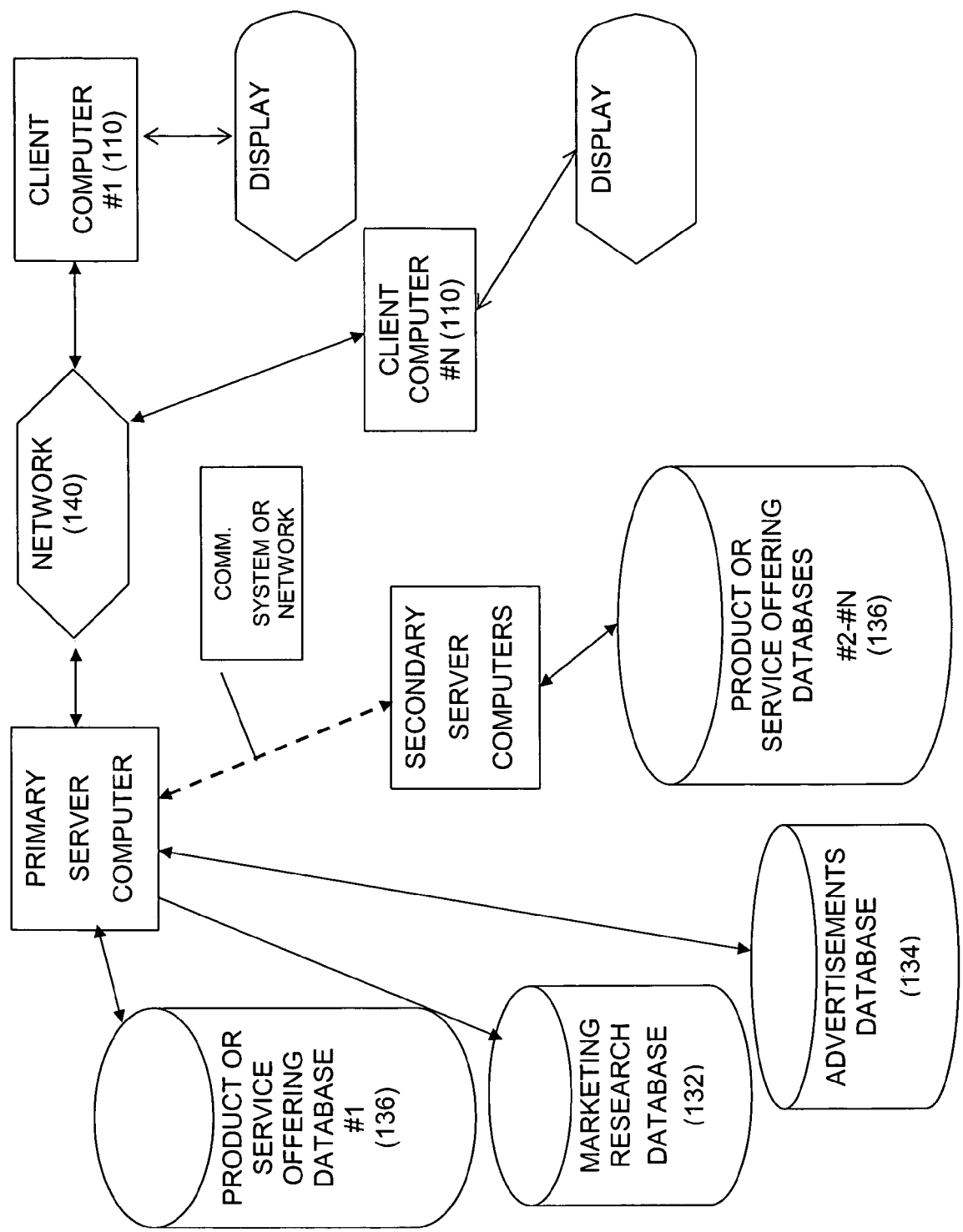
FIG. 2 is a block diagram of another version of the system architecture of the present invention.

It is appreciated that various embodiments of the present invention can utilize different hardware and system architectures. FIG. 1 illustrates an embodiment of the present invention wherein all the databases 130 are located at one central server 120. FIG. 2 illustrates an embodiment of the present invention wherein the product information databases 136 are distributed over several servers 120. Similarly, the market research database 132 and the advertisements database 134 can be distributed over several servers 120. It is appreciated that FIGS. 1 and 2 illustrate the databases 130 separately only to indicate their functionality, and that, physically, they may be located either on one physical device or over several physical devices.

As illustrated in FIGS. 1 and 2, when a user uses a client computer 110 to accesses the server 120 over a computer or communications network 140, such as the Internet, the client computer 110 transmits messages indicating that a user is requesting product or service offering information to the server 120. The server 120 responds with a menu of choices to enable the user find the desired products or service offerings, e.g., the products and service offerings that satisfy the user's specifications and/or preferences. The menu of choices include, but are not limited to, the selection of range limits, the specification of discrete attributes, and the selection of parameters for ranking such product or service offerings, such as the preferred direction of such rankings. The server 120 provides the user with the option to specify as much or as little as the user chooses, including the option of specifying new parameters and attributes not available or offered by the system 100. The client 110 computer then transmits the user selections back to the server 120. The server 120 accesses its product database or databases 136 to search for products or service offerings meeting the user specifications. The server 120 also updates the marketing research database or databases 132 with information about the user's actions. When the server 120 retrieves products or service offerings from the product database or databases 136, it ranks them in accordance with the user specifications. If the user does not specify any ranking rules, the server 120 applies default rules. The server 120 then transmits the selected and ranked products or service offerings to the user's client computer 110. In an embodiment of the present invention, the advertisements database(s) 134 contains indicators regarding the rank of the product or service offering for which the advertisement should be presented. Based on the rankings, the server 120 searches the advertisement database(s) 134 for advertisements suitable for the products or service offerings just retrieved. If the advertisements database(s) 134 contains any advertisements fitting the selected products or service offerings, the server 120 transmits such advertisements to the user's client computer 110 for display.

Figure 4:
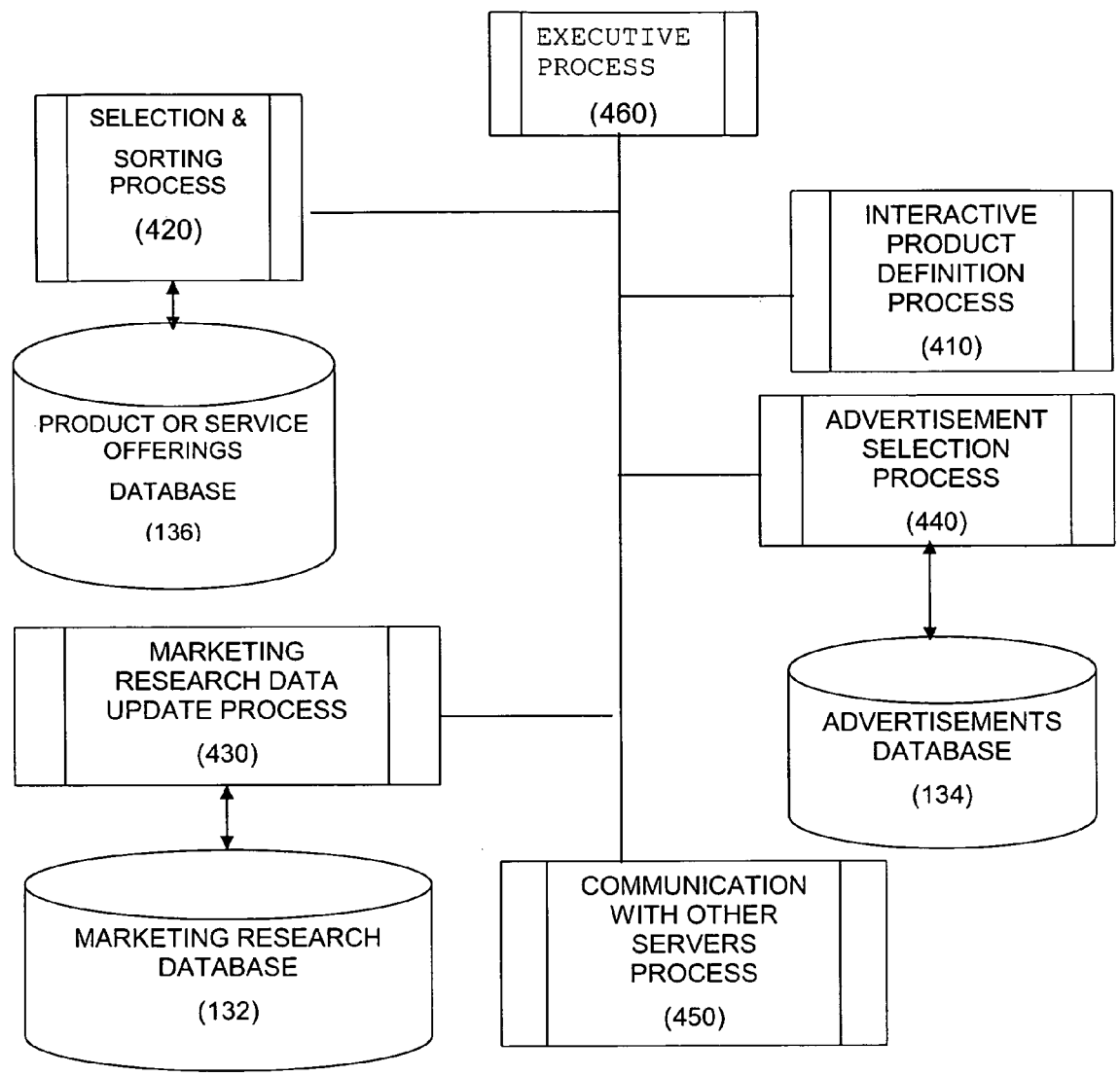
FIG. 4 is a block diagram of the system software architecture of the present invention.

In accordance with an embodiment of the present invention, FIG. 4 illustrates system 100 comprising an interactive product definition (IPD) module or process 410, a selection and sorting (SAS) module or process 420, a marketing research data update (MRDU) module or process 430, an advertisement selection (AS) module or process 440, a communication with other servers (CWOS) module or process 450, an executive module or process 460, the product or service offering database 136, the marketing research database 132, and the advertisement database 134. Accordingly, the system 100 provides a mechanism for obtaining marketing research data, providing for a unified interactive product selection and research process, and targeting advertising content in a communications network or other comparable medium.

The IPD module 410 handles user requests and accepts user requests for product or service offering information. The IPD module 410 communicates with the user, guiding the user in the determination of such user's needs and desires regarding the product or service offering. For example, the IPD module 410 comprises, but is not limited to, the range limit selection, discrete attribute selection, and ranking parameter/direction selection. In an automobile example, the IPD module 410 can provide for the selection of a price range, mileage range, driving wheels (i.e., front, rear, 4×4), as a discrete attribute selection, and driver legroom space, trunk space, braking distance and horsepower as ranking parameters. The user can independently set the direction of each ranking parameter, e.g., ascending for braking distance and descending for horsepower. If a user selects more than one ranking parameter, the user can prioritize the importance of each ranking parameter. The user can also select the amount of information to be displayed with each product model or service offering that meets the user's specifications.

For example, the user can request automobiles having the following criteria and attribute ranges: (a) four door sedan; (b) ABS braking system; (c) new (current year) models only; (d) price between $18,000 and $23,000; (e) trunk volume between 10 and 15 cu. Ft.; (f) highway mileage between 28 and 32 miles per gallon; and (g) front legroom greater than 42 in. The user can then display the results (i.e., automobiles falling within the specified ranges and possessing the specified criteria) ranked as follows: first by price, lowest first, then by horsepower, highest first, then by front headroom, highest first, then by manufacturer, alphabetically. For laptop computers, a user can request laptop computers having the following criteria and attribute ranges: (a) an integrated network adapter; (b) weigh less than 3.5 pounds; (c) price between $1,500 and $2,800; and (d) display size greater than 10.5 in. Criteria input might be an integrated network adapter. The user can then display the results (i.e., all laptop computers falling within the specified ranges and possessing the specified criteria) ranked as follows: first by price, lowest first, then by weight, lowest first, then by CPU speed in MHz, highest first, then by display size, highest first.

When the user indicates that all requirements have been transmitted to the server 120, the server 120 initiates the execution module 460 which coordinates the data transfers among various modules and controls their execution. The execution module 460 initiates the SAS module 420 which solicits and receives information, such as user's specifications and preferences, from the user. The SAS module 420 searches the database 136 for all products or service offerings meeting or satisfying the user's specifications as determined by the IPD module 410, and then sorts these selected products or service offerings in accordance with the ranking specifications. The SAS module 420 also retrieves the information to be sent to the user per user's specifications, which can be less than the total information available in the database 136. If the user does not specify the type of information to be shown for the selected products or service offerings, the SAS module 420 provides a default set of information for the selected products or service offerings. For example, the SAS module 420 can use the values associated with the user's selection, e.g., the range parameters, the discrete attribute selections, and the ranking parameters, as a default set of information. Alternatively, the SAS module 420 can use the historical information in the marketing research database 132 or the display requests of previous users desiring products with similar specifications to generate a default set of information.

The server 120 via the execution module 460 also sends or transmits the user's input to the MRDU module 430. The MRDU module 430 stores all of the user parameters and specifications, such as range limits, discrete attributes, ranking parameters and priorities (including direction), and virtual reality product/service examination, as a record (also referred to herein as a transaction) in the marketing research database 132. The MRDU module 430 also stores any product information requested by the user into the database 132 along with the current time and date as part of the transaction, for use in trend analysis when sufficient data has been accumulated. The MRDU module 430 keeps such transactions open for additional data as the user refines and explores products or service offerings, including virtual reality explorations and investigations. The MRDU module 430 closes such transactions when the user exits the system 100. Upon exit, the MRDU module 430 records the user's next destination, e.g., another web site, such as an advertiser's web site, a product or service offering selling site, another type of associated web site, offline (exists the Internet) or otherwise. The MRDU module 430 can utilize the exit destination information to weigh the transaction data in subsequent analysis and reporting. It is appreciated that the marketing research database(s) 132 stores or records only user's selections and preferences, and no personal or identification information of the user is stored to preserve user's privacy. That is, the information stored in the marketing research database(s) 132 is depersonalized and cannot be traced back to a particular user.

The AS module 440 receives the ranked product or service offering information from the SAS module 420 and utilizes rule based techniques to select advertisements from the advertisements database 134 in accordance with the received ranked product or service offering information. That is, the AS module 440 uses rules to determine which advertisements, if any, should be presented to the user. The AS module 440 also arbitrates which advertisement(s) should be presented to the user if the number of possible advertisements exceeds a predetermined number, e.g., one.

The CWOS Module 450 coordinates the communications between various servers 120 when the system databases 130 are located on multiple servers 120. In accordance with an aspect of the present invention, the SAS module 420 initiates requests for remote database access by transmitting such requests to the CWOS module 450. The CWOS module 450 then sends such requests for information to the remote servers 120. If the data structure of the remote database(s) differs from the structure of the local database, the CWOS module 450 harmonizes the received information to match the data structure of the local database. Similarly, the CWOS module 450 also converts the query format of the requests to a format that is supported by the remote database 130. It is appreciated that the marketing research database(s) 132, the advertisement database(s) 134, the product or service offerings database(s) 136, or any combination thereof can be distributed across multiple servers 120. The CWOS module 450 performs a similar role regardless of which database (or a combination of databases) is located on multiple servers 120. In an embodiment of the present invention, the system 100 divides the databases 130 by brand, e.g., product or service offering brand. Alternatively, the system 100 can divide the databases 130 by attributes. For example, the system 100 can separate automobile databases by manufacturer (brand), or by type, such as sedan, sports car, sport utility vehicle, or by attribute, such as by country or region, e.g., European, Japanese, German, etc. In the case of hotel databases, the system 100 can divide the databases 130 by chain (brand), such as Sheraton® or Hilton®, or by attribute, such as location, which can be further divided by country, or central city location, or beach front, and etc.

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiment discussed above, those various alternatives, which have been described and all equivalents thereto.

What is claimed:

1. A method for obtaining consumer preferences for a product/service category over a communications network from a plurality of consumers, comprising the steps of:
    receiving one or more product/service criteria for said product/service category from a consumer and at least one of said product/service criteria as a ranking parameter from said consumer;
    searching a database connected to said network having product/service information for products or services in said product/service category based solely on said product/service criteria received from said consumer, such that the search is based solely on consumer's explicit search criteria;
    ranking products or services in said product/service category satisfying said product/service criteria in accordance with said ranking parameter received from said consumer to provide a ranked list, thereby ranking the search result based solely on said consumer's explicit order of importance; and
    storing said product/service criteria received from said consumer and said ranking parameter received from said consumer as market research data of consumer preferences in said database without storing information identifying or specific to said consumer, thereby obtaining market research data anonymously based solely on consumer's explicit selections without receiving or collecting information identifying or specific to said consumer to preserve the privacy of said consumer.

2. The method of claim 1, wherein the step of searching searches said database for products or services that matches closest to said selected product/service criteria.

3. The method of claim 1, further comprising the step of receiving one or more new product/service criteria from said consumer if it is determined that no product or service in said database satisfies said selected product/service criteria; and wherein the step of searching searches said database for products or services in said product/service category based on said new product/service criteria.

4. The method of claim 1, further comprising the steps of:
    selecting one or more products or services from said ranked list by said consumer;
    retrieving product/service information for said selected products or services from said database;
    displaying product/service information of said selected products or services on a processing device associated with said consumer; and
    storing said selected products or services in said database as market research data of consumer preferences while preserving the privacy of said consumer.

5. The method of claim 4, wherein the step of displaying product/service information comprises the steps of:
    displaying said selected products or services on said processing device; and
    controlling the display of said selected products or services by said consumer to enable said consumer to virtually investigate or examine said selected product or services.

6. The method of claim 4, wherein the step of displaying product/service information comprises the steps of:
    generating a virtual representation of said consumer in accordance with information received about the physical characteristics of said consumer;
    displaying said selected products along with said virtual representation of said consumer to provide virtual display of said selected products; and
    controlling said virtual display by said consumer to enable said consumer to virtually investigate and test the fit of said selected products using said virtual representation of said consumer.

7. The method of claim 1, further comprising the step of receiving a range for each product/service criteria selected by said consumer.

8. The method of claim 1, further comprising the steps of:
    receiving additional product/service criteria from said consumer;
    searching said database for products or services in said product/service category based on said selected product/service criteria and said additional product/service criteria;
    ranking products or services related to said selected product/service criteria and said additional product/service criteria in accordance with said ranking parameter; and storing said additional product/service criteria as market research data of consumer preferences in said database without storing information identifying or specific to said consumer, thereby obtaining market research data anonymously based solely on consumer's explicit selections without receiving or collecting information identifying or specific to said consumer to preserve the privacy of said consumer.

9. The method of claim 1, wherein said database includes advertisements and further comprising the step of:
    selecting an advertisement from said database in accordance with said selected product/service criteria; and
    displaying said advertisement along with said ranked list on a processing device associated with said consumer.

10. The method of claim 1, further comprising the steps of selecting an advertisement from an advertisement database in accordance with said selected product/service criteria and displaying said advertisement along with said ranked list on a processing device associated with said consumer.

11. The method of claim 1, further comprising the step of generating a report indicating a consumer trend from said market research data of consumer preferences in said database for a product or service selected by an operator.

12. A non-transitory computer readable medium comprising computer executable code for obtaining consumer preferences for a product/service category over a communications network from a plurality of consumers, said code comprising instructions for:
    receiving one or more product/service criteria for said product/service category from a consumer and at least one of said product/service criteria as a ranking parameter from said consumer;
    searching a database having product and service information for products or services in said product/service category based solely on said product/service criteria received from said consumer, such that the search is based solely on consumer's explicit search criteria;
    ranking products or services in said product/service category satisfying said product/service criteria in accordance with said ranking parameter received from said consumer to provide a ranked list, thereby ranking the search result based solely on said consumer's explicit order of importance; and
    storing said product/service criteria received from said consumer and said ranking parameter received from said consumer as market research data of consumer preferences without storing information identifying or specific to said consumer, thereby obtaining market research data anonymously based solely on consumer's explicit selections without receiving or collecting information identifying or specific to said consumer to preserve the privacy of said consumer.

13. The computer readable medium of claim 12, wherein said code further comprises instructions for searching said database for products or services that matches closest to said selected product/service criteria.

14. The computer readable medium of claim 12, wherein said code further comprises instructions for:
    receiving one or more new product/service criteria from said consumer if it is determined that no product or service in said database satisfies said selected product/service criteria; and
    searching said database for products or services in said product/service category based on said new product/service criteria.

15. The computer readable medium of claim 12, wherein said code further comprises instructions for:
    selecting one or more products or services from said ranked list by said consumer;
    retrieving product/service information for said selected products or services from said database;
    displaying product/service information of said selected products or services on a processing device associated with said consumer; and
    storing said selected products or services in said database as market research data of consumer preferences while preserving the privacy of said consumer.

16. The computer readable medium of claim 15, wherein said code further comprises instructions for:
    displaying said selected products or services on said processing device; and
    controlling the display of said selected products or services by said consumer to enable said consumer to virtually investigate or examine said selected products or services.

17. The computer readable medium of claim 15, wherein said code further comprises instructions for:
    generating a virtual representation of said consumer in accordance with information received about the physical characteristics of said consumer;
    displaying said selected products or services along with said virtual representation of said consumer to provide virtual display of said selected products; and
    controlling said virtual display by said consumer to enable said consumer to virtually investigate and test the fit of said selected products using said virtual representation of said consumer.

18. The computer readable medium of claim 12, wherein said code further comprises instructions for receiving a range for each product/service criteria selected by said consumer.

19. The computer readable medium of claim 12, wherein said code further comprises instructions for:
    receiving additional product/service criteria from said consumer;
    searching said database for products or services in said product/service category based on said selected product/service criteria and said additional product/service criteria;
    displaying a list of products or services related to said selected product/service criteria and said additional product/service criteria on said processing device, said list being ordered in accordance with said ranking parameter; and
    storing said additional criteria in said database as market research data of consumer preferences without storing information identifying or specific to said consumer, thereby obtaining market research data anonymously based solely on consumer's explicit selections without receiving or collecting information identifying or specific to said consumer to preserve the privacy of said consumer.

20. The computer readable medium of claim 12, wherein said database includes advertisements and wherein said code further comprises instructions for:
    selecting an advertisement from said database in accordance with said selected product/service criteria; and
    displaying said advertisement along with said ranked list on a processing device associated with said consumer.

21. The computer readable medium of claim 12, wherein said code further comprises instruction for generating a report indicating a consumer trend from said market research data of consumer preferences for a product/service category selected by an operator.

22. A method for targeting advertisement over a communications network, comprising the steps of:
receiving one or more product/service criteria for said product/service category from a consumer and at least one of said product/service criteria as a ranking parameter from said consumer;
searching a product database having product and service information for products or services in said product/service category based solely on said product/service criteria received from said consumer and an advertisement database for an advertisement based solely on said product/service criteria received from said consumer, such that searches are based solely on consumer's explicit search criteria;
ranking products or services in said product/service category satisfying said product/service criteria in accordance with said ranking parameter received from said consumer to provide a ranked list, thereby ranking the search result based solely on said consumer's explicit order of importance;
displaying said advertisement and said ranked list on a processing device associated with said consumer; and
storing said product/service criteria received from said consumer and said ranking parameter received from said consumer as market research data of consumer preferences without storing information identifying or specific to said consumer, thereby obtaining market research data anonymously based solely on consumer's explicit selections without receiving or collecting information identifying or specific to said consumer to preserve the privacy of said consumer.

23. A non-transitory computer readable medium comprising computer executable code for targeting advertisement over a communications network, said code comprising instructions for:
receiving one or more product/service criteria for said product/service category from a consumer and at least one of said product/service criteria as a ranking parameter from said consumer;
searching a product database having product and service information for products or services in said product/service category based solely on said product/service criteria received from said consumer and an advertisement database for an advertisement based solely on said product/service criteria received from said consumer, such that searches are based solely on consumer's explicit search criteria;
ranking products or services in said product/service category satisfying said product/service criteria in accordance with said ranking parameter received from said consumer to provide a ranked list, thereby ranking the search result based solely on said consumer's explicit order of importance;
displaying said advertisement and said ranked list on a processing device associated with said consumer; and
storing said product/service criteria received from said consumer and said ranking parameter received from said consumer as market research data of consumer preferences without storing information identifying or specific to said consumer, thereby obtaining market research data anonymously based solely on consumer's explicit selections without receiving or collecting information identifying or specific to said consumer to preserve the privacy of said consumer.

* * * * *